Patented Apr. 28, 1936

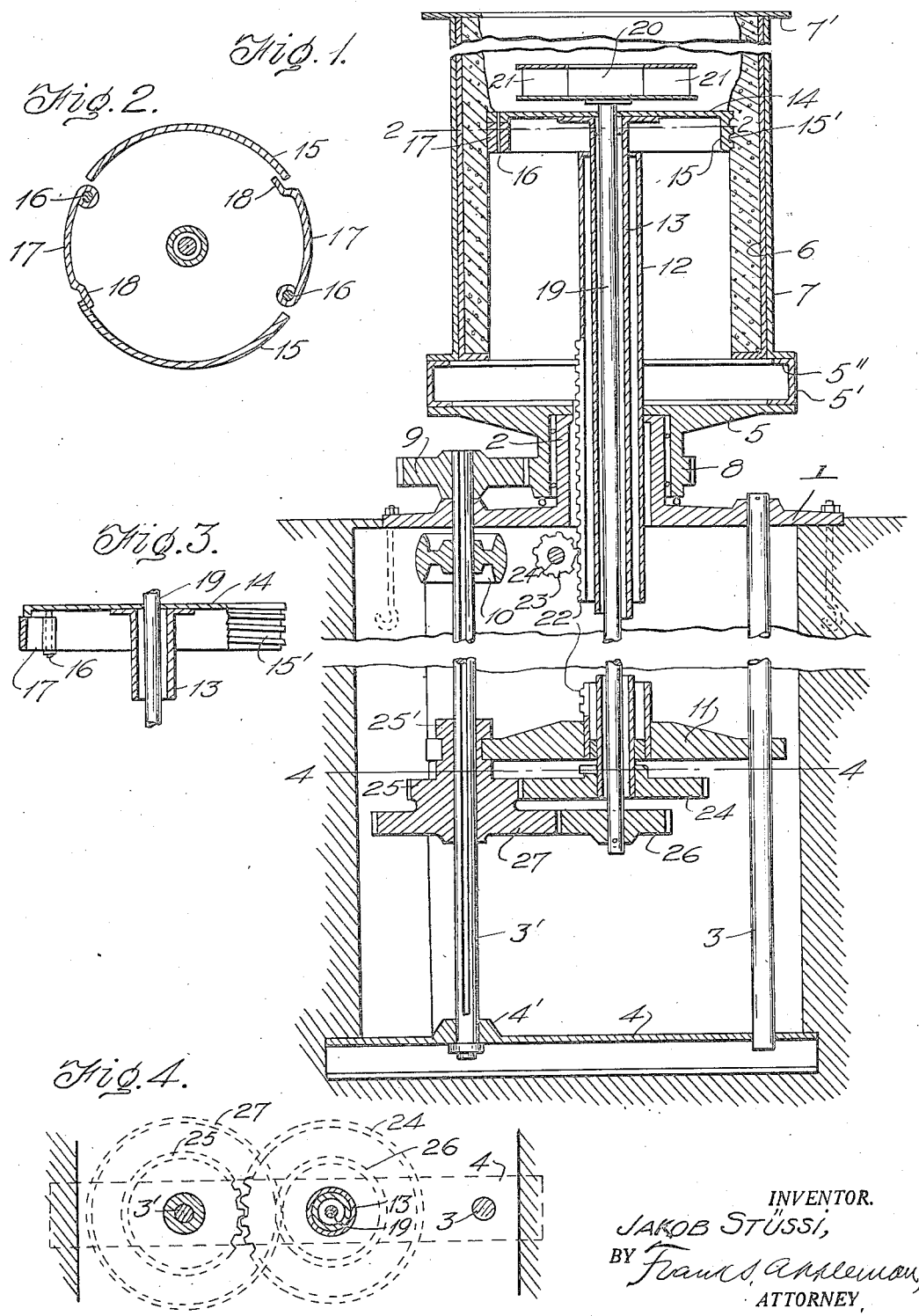

2,038,861

UNITED STATES PATENT OFFICE 2,038,861

APPARATUS FOR PRODUCING HOLLOW CONCRETE PIPES AND THE LIKE

Jakob Stüssi, Lucerne, Switzerland

Application July 18, 1933, Serial No. 681,107
In Germany July 18, 1932

4 Claims. (Cl. 25—30)

This invention relates to apparatus for manufacturing concrete pipe, hollow concrete masts, columns and posts and other hollow concrete articles of like character, and has special reference to centrifugal apparatus for this purpose.

Centrifugal apparatus depending on throwing or casting concrete against the inner surface of a mold has been used, but such apparatus generally throws the concrete in its wet and plastic condition with very considerable force against the mold wall. This results in disintegration of the concrete so that the heavier aggregate lies to the outer side of the concrete mass while the finer material will lie on the inner side of the mass. This causes the cement, lime and other light materials and water to collect on the inner face of the pipe and form a skin of greater cement content on the inner side and a mass deficient in cement and containing an excess of concrete on the outer side. Thus the outer part of such a hollow concrete body is weak and the inner part is liable to crack and the crevices produced by such cracks require to be filled by further treatment and adds to the expense of manufacture.

The principal object of the invention is to provide a novel device wherein the concrete is thrown against the mold wall with much more force than the force usually employed, thus avoiding together with the fact that a dry concrete is used, the separation of the lighter and heavier materials and the consequent weakening of the outer part of the casting and the cracking of the inner surface.

A second important object of the invention is to provide, in such an apparatus, means to smooth the inner surface.

A third important object of the invention is to provide a novel arrangement of apparatus of this class, wherein the smoothing and throwing means are so associated that the smoothing means follows, in its action on the concrete, closely after the concrete is thrown outwardly by the throwing means.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a vertical section taken diametrically through the invention;

Figure 2 illustrates a detail section on the line 2—2 of Fig. 1;

Figure 3 illustrates a vertical section partly in elevation of the smoothing means used herein; and Figure 4 illustrates a section on the line 4—4 of Fig. 1.

Mounted on the upper part of a suitable hollow foundation is a base plate 1 having a centrally disposed hollow cylindrical boss 2. A vertical guide member 3 has its upper end fixed to the base plate 1 and its lower end fixed to a transverse member 4 firmly mounted in the bottom of the hollow foundation. This member 4 is provided with a suitable bearing 4' wherein is journalled the lower end of a vertical shaft 3' having its upper end journalled in the base plate 1. This shaft 3' is provided with a splineway extending substantially its full length. On the boss 2 is journalled a gear 8 carrying a mold base 5 on the peripheral portion of which is mounted an upstanding channel bar 5' having an upper flange 5". On the upper end of the shaft 3' is keyed a gear 9 which meshes with the gear 8. A cross-head 11 is slidably mounted at one end on the guide 3 and its other end is forked and straddles the shaft 3' in spaced relation thereto.

Mounted on the flange 5" is an outer mold shell or pipe 7 within which is fitted a removable inner mold shell or pipe 6, the internal diameter of which equals the outer diameter of the hollow concrete casting desired. This inner pipe 6 has an upper flange 7' and is preferably made of waterproof stiff material such as tin or sheet iron. A tubular member 12 has its lower end fitted fixedly in a suitable vertical opening in the cross-head 11 and extends up through the cylindrical boss 2. A hollow shaft 13 is mounted revolubly in the member 12 and projects at its lower end below the cross-head 11. On the lower end of the tubular shaft 13 there is fixed a gear 24 which meshes with a gear 25 splined on the shaft 3'. This gear 25 is provided with a grooved collar 25' which is held by the forked end of the cross-head to move up and down the shaft 3' as the cross-head 11 moves on the guide 3. On the upper end of the hollow shaft 13 is supported a disk or circular head 14 having depending segmental flange portions 15 forming a gapped or divided cylinder. The outer faces of the portions 15 are grooved to provide threaded portions 15'. Bolts 16 are fixed to the plate or disk 14 adjacent one edge of each portion 15 and extend vertically downward from the disk. Pivoted on each bolt 16 is an arcuate trowel member 17 having an inwardly offset free end 18 forming a limit stop for the outwardly swinging movement of said trowel member. Extending through the hollow shaft 13 is a shaft 19 which projects below the shaft 13 and has a gear 26 fixed on the projecting end to mesh with a gear 27 formed integrally with the gear 25.

On the upper end of the shaft 19 there is fixed a concrete slinging or throwing device 20 provided with slinging or throwing paddles 21. A belt pulley 10 is fixed on the shaft 3' and forms means by which a belt may be used to operate the apparatus. The tubular member 12 is provided with rack teeth 22 wherewith meshes a gear 23 fixed on a horizontal shaft 24 which is mounted in fixed journals and rotated, when desired, by any suitable means such as a crank, the journals and rotating means not being shown.

In operation, the shaft 24 is rotated until the cross-head 11 assumes its lowest position. The shaft 3' is driven by the belt pulley and this device 20 is supplied with concrete.

Through the gearing, the shaft 19 is revolved rapidly, the hollow shaft 13 less rapidly and mold base 5 still less rapidly. Due to the high speed of the shaft 19 the concrete supplied to the device 20 is thrown against the inner surface of the inner pipe or shell 6 and, as the throwing device 20 is moved up and down by properly operating the shaft 24, successive layers of concrete are deposited until the internal diameter of the concrete mass is such that the trowels 17 engage the inner face of the concrete and smooth it, the disk or head 14 serving to scrape off, in its upward movement, any excess concrete and fill in any small gaps. When the inner surface of the pipe has been rendered smooth, the supply of concrete is stopped and the cross-head brought to its lowest position. The inner impervious shell, which has prevented the escape of water by centrifugal action, and the formed concrete are now removed and set aside for the concrete to harden. Due to the thinness of the inner shell, such shells may be cheaply made and they can be repeatedly used.

I claim:

1. In a machine for producing hollow objects of plastic material consisting of an outer pipe, an inner removable pipe contacting therewith, means for rotatably supporting the same, a member rotatable within the inner pipe and operative to distribute said plastic material on the inner surface of the inner pipe by centrifugal force, a calibrating and smoothing element rotatable within the pipe and operative to smooth the inner surface of the plastic material and comprising a disk, a divided cylinder, sections of which are spaced apart and troweling elements arranged between the spaced cylinder sections, each troweling element having one end hinged to the disk and the other end being free to move outwardly under centrifugal force to engage the plastic material, the said device including means for exerting pressure laterally on the inner surface of the said plastic material, and means for rotating the assembled pipes, the distributor of the plastic material and the calibrating and smoothing element at different R. P. M.

2. A machine for producing hollow objects of plastic material consisting of a rotatably mounted pipe, a hollow shaft rotatable in the pipe, a calibrating and smoothing element carried by the hollow shaft and having hingedly mounted sections with free ends adapted to be moved outwardly under centrifugal force, a shaft extending through the hollow shaft, a member thereon to which plastic material is delivered, means for rotating the member to effect centrifugal distribution of the material against the inner wall of the pipe, means for rotating the hollow shaft and consequently the calibrating and smoothing element at a reduced R. P. M. as compared with that of the distributing element, and means for rotating the pipe at an R. P. M. reduced as compared with the R. P. M. of the distributing element and the calibrating and smoothing element.

3. In a machine for producing hollow objects of plastic material consisting of an outer pipe, an inner removable pipe contacting therewith, means for rotatably supporting the same, a member rotatable within the inner pipe and operative to distribute said plastic material on the inner surface of the inner pipe by centrifugal force, a calibrating and smoothing element rotatable within the pipe and operative to smooth the inner surface of the plastic material, said last mentioned element having peripheral material engaging elements, means for mounting them whereby they move outwardly under centrifugal force for exerting pressure laterally on the surface of said plastic material, and means for rotating the assembled pipes, the distributor of the plastic material and the calibrating and smoothing element at different R. P. M.

4. A machine for producing hollow objects of plastic material consisting of a pipe, means for rotatably supporting the said pipe, a rotatable member for distributing plastic material by centrifugal force including means for rotating it, a calibrating and smoothing element rotatable within the pipe and comprising a disk, a divided cylinder thereon, troweling elements located between the said divisions of the cylinder, pivots carried by the disk on which one end of each troweling member is hinged, the free ends of said troweling member being free to move outwardly under centrifugal force, and means for rotating the said disk.

JAKOB STÜSSI.